United States Patent [19]

Lederman

[11] Patent Number: 4,971,184
[45] Date of Patent: Nov. 20, 1990

[54] OVERRUNNING CLUTCH WITH LUBRICANT SPREADING AND DISTRIBUTION MEANS

[75] Inventor: Frederick E. Lederman, Sandusky, Ohio

[73] Assignee: General Motors Corporation, Detroit, Mich.

[21] Appl. No.: 390,143

[22] Filed: Aug. 7, 1989

[51] Int. Cl.[5] .................. F16D 47/04; F16D 13/74
[52] U.S. Cl. .................. 192/48.92; 192/45; 192/70.12; 192/113 B
[58] Field of Search ............ 192/45, 48.3, 48.92, 192/70.12, 113 B

[56] References Cited

U.S. PATENT DOCUMENTS

| | | | |
|---|---|---|---|
| 3,175,661 | 3/1965 | Maurer et al. | 192/45.1 |
| 4,291,795 | 9/1981 | Charchian et al. | 192/113 B |
| 4,714,803 | 12/1987 | Lederman | 192/41 R |
| 4,782,931 | 11/1988 | Lederman | 192/70.12 |

FOREIGN PATENT DOCUMENTS

| | | | |
|---|---|---|---|
| 3611003 | 10/1987 | Fed. Rep. of Germany | 192/113 B |
| 2073338 | 10/1981 | United Kingdom | 192/48.92 |

*Primary Examiner*—Richard Lorence
*Attorney, Agent, or Firm*—Patrick M. Griffin

[57] ABSTRACT

Lubricant is fed though the outer race of a roller clutch and to the gaps between an interleaved set of friction plates through the cooperation of a flared feed passage, which partially spreads the flow, and either a spray plug or manifold, which further spreads and distributes the lubricant flow to the gaps.

3 Claims, 2 Drawing Sheets

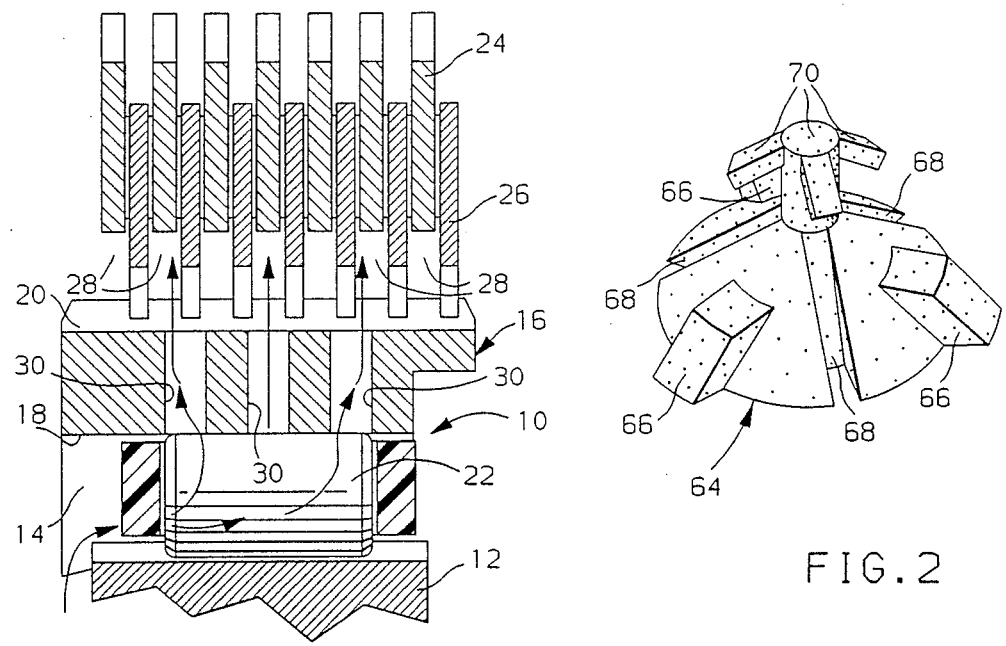
FIG. 1 PRIOR ART
FIG. 2
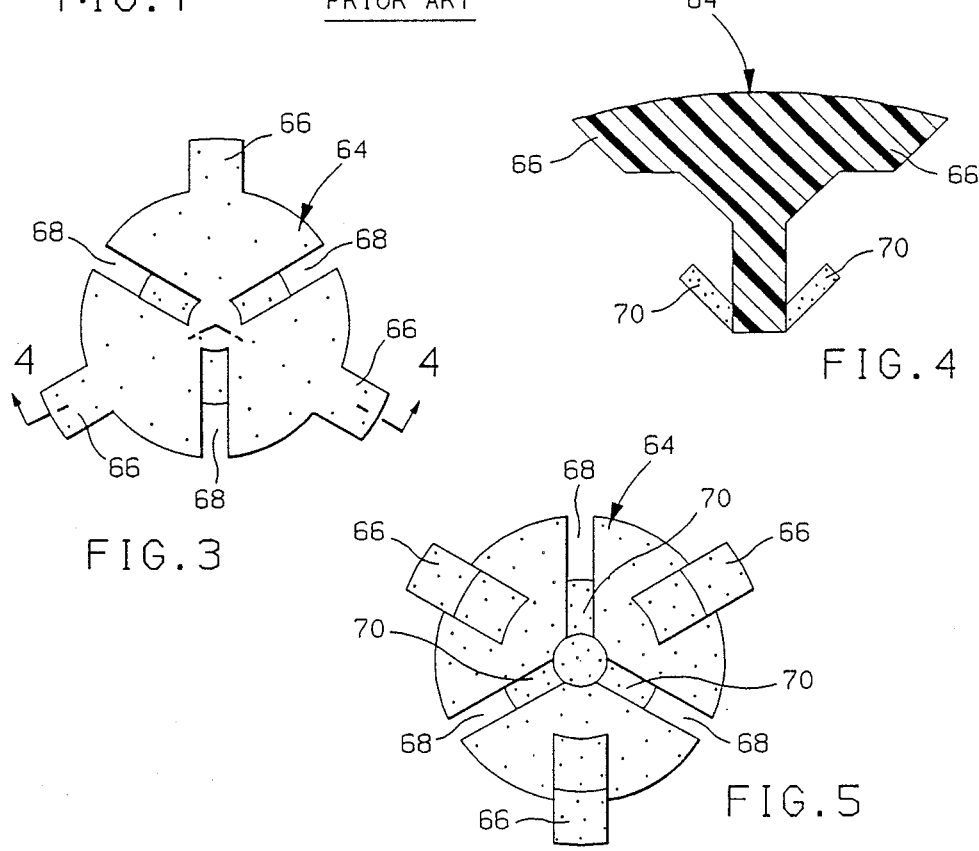
FIG. 3
FIG. 4
FIG. 5

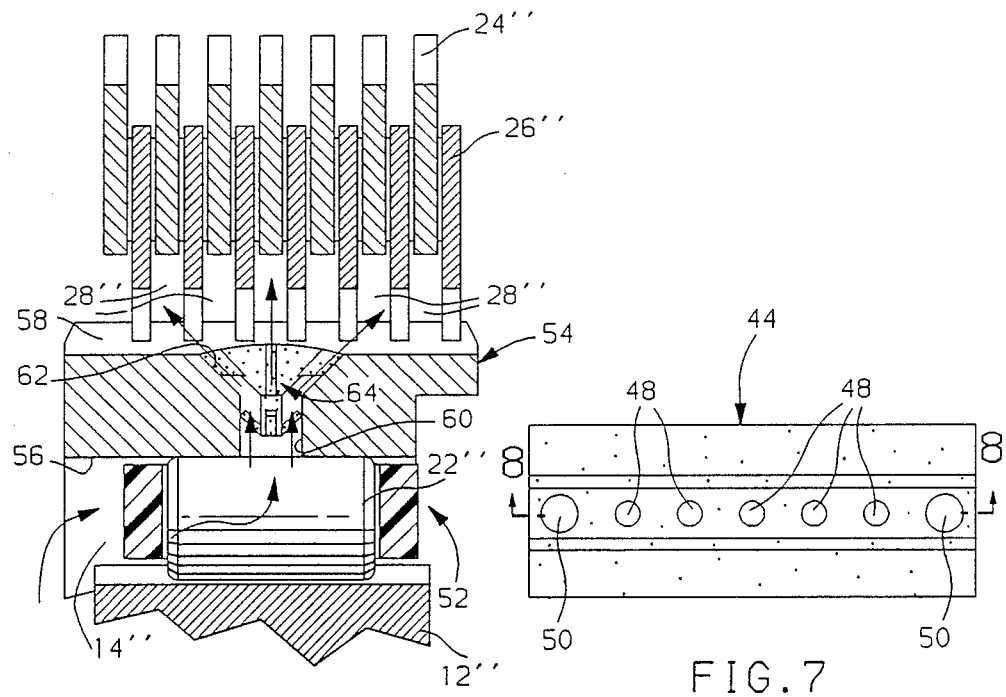
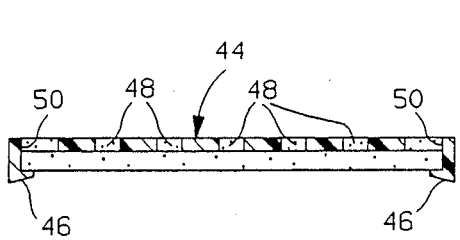
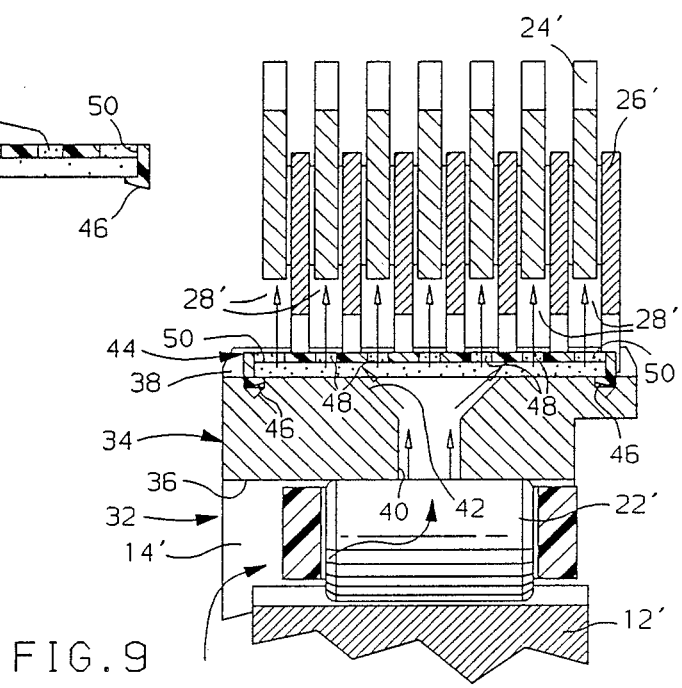

OVERRUNNING CLUTCH WITH LUBRICANT SPREADING AND DISTRIBUTION MEANS

This invention relates to overrunning roller clutches in general, and specifically to a roller clutch assembly in which an improved means is provided for routing a lubricant flow through the outer race and distributing it to an interleaved set of clutch plates splined to the outer race.

BACKGROUND OF THE INVENTION

Automatic vehicle transmissions incorporate roller clutch assemblies that act as speed sensors to smooth the shifting process. The roller clutch has an inner race and an annularly spaced outer race, with a complement of caged rollers located therebetween. Often, the outer race is the pathway race, meaning that it has a cylindrical inner surface pathway that the rollers roll on. Two interleaved sets of friction plates surrounding the outer race are alternately pushed together or released to selectively transfer power between the transmission's torque converter and the particular gear set served by the input unit. One of the sets of plates is tied to the outer race, generally by being fitted over axial splines on the outer surface of the outer race. Therefore, a series of gaps is formed by the interleaved plates, arrayed along the length of the outer race. When the roller clutch overruns, the clutch plates are released and rotate very rapidly relative to one another, with a very close clearance. To avoid over heating between the plates, a flow of cooling lubricant must be supplied to the gaps. Such lubricant generally originates from a central shaft surrounded by the inner clutch race, and is fed into the side of the annular space between the races. From there, the lubricant must somehow get to the gaps between the clutch plates, but the outer race occupies the most direct path.

The most common manner of feeding the lubricant between the interleaved plates is to simply drill feed passages radially through the outer race, from its pathway to its outer surface. As the roller clutch overruns and spins rapidly, lubricant in the annular space is flung out against the pathway, and is thereby forced through the feed passages directly into the gaps between the plates. This approach, although straightforward, presents potential problems, since the rollers roll on the pathway. It is desirable that the entry point of each lubricant feed passage be centrally located, so that the ends of the rollers will not click over it. But, since the gaps between the outboard plates are widely axially separated, it is also necessary that the exit points of at least some of the feed passages not be centrally located. The solution has generally been to drill a large number of small diameter feed passages at an angle, which is difficult and expensive. Furthermore, being angled, the passages are longer, and the pressure drop the lubricant flow experiences through them is greater than would be the case for a straight passage.

SUMMARY OF THE INVENTION

The invention provides a means of more efficiently feeding, spreading and distributing lubricant through the outer race to the clutch plates.

Two embodiments of a roller clutch assembly incorporating the invention are disclosed. A series of lubricant feed passages are drilled radially straight through the outer race. Rather than being a constant diameter, however, each feed passage has a first, smaller diameter entry opening located centrally in the pathway, which flares conically outwardly to a second, larger diameter exit opening. By making the feed passage entry smaller in diameter, and by locating it centrally, disruption in the pathway is minimized while separation from the ends of the rollers is maximized. Furthermore, by flaring the feed passage out to the exit, the lubricant flow is partially spread out axially, and experiences less pressure drop than it would in flowing through a smaller, constant diameter feed passage.

The invention also includes a lubricant distribution means that cooperates with each feed passage to further axially spread and distribute the lubricant flow to the gaps between the plates. In one embodiment, a conical spray plug is pressed into the feed passage exit. The spray plug has flared out channels which are restricted in size so as to increase the velocity of part of the lubricant flow, thereby spraying it farther out to reach the gaps between the outboard clutch plates. In another embodiment, a rectangular manifold plate is fitted over the feed passage opening. The manifold plate has a line of axially spaced ports, which are larger at the outboard locations, so as to more evenly distribute and spread the lubricant flow to the plate gaps.

It is, therefore, an object of the invention to provide improved lubricant feed directly through the outer race of a clutch assembly to the gaps between two sets of interleaved clutch plates.

It is another object of the invention to provide such improved lubricant flow through the use of a flared feed passage that partially spreads the flow, combined with a device that further spreads and distributes the flow to the gaps.

It is another object of the invention to provide for such increased spreading and distribution of the flow with a conical spay plug having restricted, velocity increasing channels.

It is yet another object of the invention to provide for such increased spreading and distribution of the flow with a manifold plate located over the exit of the feed passage.

DESCRIPTION OF THE PREFERRED EMBODIMENT

These and other objects and features of the invention will appear from the following written description, and from the drawings, in which:

FIG. 1 is a cross sectional view of a prior art clutch assembly;

FIG. 2 is a perspective view of the spray plug used in a first embodiment of the invention;

FIG. 3 is a top end view of the spray plug;

FIG. 4 is a sectional view of the spray plug taken along the line 4—4 of FIG. 3;

FIG. 5 is a bottom end view of the spray plug;

FIG. 6 is a view similar to FIG. 1, but showing the spray plug incorporated in the first embodiment of the invention;

FIG. 7 is a top plan view of the manifold plate used in the second embodiment of the invention;

FIG. 8 is a sectional view of the manifold plate taken along the line 8—8 of FIG. 7;

FIG. 9 is a view similar to FIG. 6, but showing the second embodiment of the invention.

Referring first to FIG. 1, a conventional type overrunning clutch assembly is indicated generally at 10. Clutch assembly 10, as well as the invention, is used in an automatic transmission input unit, of the type that is more fully described in commonly assigned U.S. Pat. No. 4,782,931 to Lederman, incorporated by reference. Specific details of the transmission are not needed to understand the invention here, however. Roller clutch assembly 10 includes an inner cam race 12 which forms an annular space 14 with an outer pathway race, indicated generally at 16. Pathway race 16 has a cylindrical inner surface or pathway 18, and an outer surface comprised of a series of axial splines 20. A caged complement of cylindrical rollers 22 rolls on pathway 18 during overrun. A first set of friction clutch plates 24 is fixed to a housing, not illustrated, while a second set of plates 26 is interfitted to the splines 20. The two sets of plates 24 and 26 are interleaved, creating a series of gaps 28 that are arrayed axially along most of the length of pathway race 16. When clutch assembly 10 overruns, the pathway race 16 spins rapidly, spinning the plates 26 just as rapidly, close to the stationary plates 24. Lubricant has to be supplied to the gaps 28 to avoid the over heating that would otherwise occur. Lubricant follows a path that first takes it under pressure from a port in a non-illustrated central shaft into the side of annular space 14, as shown by the arrows, where it goes to atmosphere. Lubricant can still move radially outwardly when needed, however, since the rapid spinning flings it into the pathway 18. If conventional and straight feed passages 30 are drilled through outer race 16, as shown, a flow of lubricant will be forced radially out through passages 30 to reach the gaps 28. However, if the feed passages are drilled straight to all of the gaps 28, including the outboard ones, then the ends of the rollers 22 engage some of the feed passage entrance holes. Therefore, such feed passages are generally drilled at an angle, as noted, with the attendant expense and difficulty.

Referring next to FIG. 9, each embodiment of the invention is incorporated in a similar roller clutch assembly. One embodiment, indicated generally at 32, is described first, since part of the structure common to the two embodiments is more visible in it. Clutch assembly 32 includes an inner race, annular space, rollers, plates and plate gaps identical to conventional clutch assembly 10, and are given the same number with a prime ('). The pathway race, indicated generally at 34, is the same size as conventional pathway race 16, and also has a cylindrical inner surface pathway 36 and outer surface splines 38. Pathway race 34 is different in several respects, however. Its feed passages do not have a constant radial dimension, being comprised instead of a smaller diameter, cylindrical entry opening 40, which flares out conically to a larger diameter exit opening 42. Exit opening 42 comes through pathway race 34 in an area where a spline 38 has been removed. While not a constant diameter, the feed passage is straight in the sense that the tools used to drill both openings would be held perpendicular to the axis of race 34, and are therefor much easier to manufacture than angled feed holes. Entry opening 42 is located essentially in the axial center of pathway 36, so the ends of the rollers 22' have a maximum separation from it, and will not roll over it. Lubricant flung out during overrun will flow straight into entry opening 40, and then flare out in a generally conical pattern toward exit opening 42, as shown by the arrows. The flared, enlarged exit opening 42 assures that there is less pressure drop as lubricant flows through than would be the case if the entire feed passage had the smaller diameter of entry opening 40.

While more lubricant would flow through if entry 40 were as large as exit 42, making it smaller minimizes the disruption in pathway 36. As lubricant flows through exit opening 42, it is spread in the axial direction, partially, though not enough to reach the most outboard plate gaps 28'. How the lubricant flow is made to reach all the gaps 28' is described next.

Referring next to FIGS. 7, 8 and 9, a manifold plate, designated generally at 44, is molded from a suitable plastic in a long rectangular shape, sized to fit in the space where the spline 38 is removed. Plate 44 has a pair of barbed feet 46 that allow it to be secured to pathway race 34, fitting closely down over exit opening 42. When the clutch plates 26' are added, therefore, they slide closely over plate 44 just as they would over a spline 38, with no modification. Running down the length of manifold 44 is a line of seven ports, smaller inboard ports 48 and larger outboard ports 50. When manifold 44 is fitted to pathway race 34, one port is registered with each gap 28'. Lubricant that flows out of exit opening 42 is blocked by manifold 44, and forced to exit the ports 48 and 50 and into all of the gaps 28'. The larger size of the outboard ports 50 assures that a roughly equal proportion of lubricant is distributed to the outboard gaps 28', compensating for pressure drop as lubricant flows out to the sides in manifold 44. Therefore, manifold 44 completes the axial spreading and distribution of lubricant that is initiated by the flared exit opening 42. While this applies some blowout force to manifold 44, it is held down by the clutch plates 26' fitting closely over it. It should be understood that there would be perhaps two or three evenly spaced exit feed passages and manifolds 44 in pathway race 34.

Referring next to FIGS. 2 through 6, a roller clutch assembly incorporating another embodiment of the invention, indicated generally at 52, may be described more succinctly, because of common structure. Clutch assembly 52 has the same inner race, annular space, caged rollers, interleaved plates and gaps as the FIG. 9 embodiment, given the same number with a double prime (''). Its outer pathway race, indicated generally at 54, is essentially identical to pathway race 34, with a cylindrical inner pathway 56, outer splines 58 with single splines selectively removed, and a feed passage having the same size entry opening 60 and flared exit opening 62. A conical spray plug, indicated generally at 64, is molded from the same plastic as manifold 44. Rather than fitting over exit opening 62, plug 64 is sized to press fit into it. A series of three evenly spaced ribs 66 alternate with three thin channels 68. The channels 68 flare out in the same direction as the flared exit opening 62. Three evenly spaced retention barbs 70 at the bottom of plug 64 are aligned with the channels 68, but axially spaced therefrom. Thus, plug 64, having no undercuts in its various surfaces, may be bypass molded. When plug 64 is pressed in, the retention barbs 70 fit tightly into the entry opening 60 to hold it down, while the ribs 66 keep it centered. Lubricant flowing through entry opening 60 begins to spread out as it enters the flared exit opening 62. Then, at least some of the flow is forced into the restricted channels 68, which increases the velocity of flow. That part of the flow is spread and sprayed out farther, so as to reach even the outboard gaps 28''. Again, while there is a blowout force on plug 64, the plates 26'' hold it down, as with manifold 44.

Other versions of a manifold or spray device may be fashioned to cooperate with the flared exit opening of the feed passage, so as to further spread and distribute the flow. The feed passage itself could be entirely conical, from entrance to exit. Therefore, it will be understood that it is not intended to limit the invention to just the embodiments disclosed.

The embodiments of the invention in which an exclusive property or privilege is claimed are defined as follows:

1. In a roller clutch assembly of the type having an inner race, a generally cylindrical outer race having an inner surface annularly spaced from said inner race and an outer surface, and a plurality of cylindrical rollers located in said annular space that roll on said outer race inner surface, said clutch assembly also having a first set of friction clutch plates secured to said outer race outer surface and a second set of clutch plates interleaved with said first set so as to define a series of gaps arrayed axially along said outer race outer surface, and in which liquid lubricant is forced radially outwardly through said annular space and toward said outer race inner surface as said clutch assembly operates, an improved means to feed said lubricant to said interleaved clutch plates, comprising, a lubricant feed passage through said outer race, said passage including a smaller diameter entry opening through said outer race inner surface to receive a flow of lubricant, said entry opening being located centrally in said outer race, so as to have maximum separation from the ends of said rollers, said feed passage also flaring conically outwardly to a larger diameter exit opening through said outer race outer surface, whereby said lubricant flow is partially axially spread out, and, lubricant distribution means located over said feed passage exit opening to further axially spread and distribute said lubricant flow to said gaps.

2. In a roller clutch assembly of the type having an inner race, a generally cylindrical outer race having an inner surface annularly spaced from said inner race and an outer surface, and a plurality of cylindrical rollers located in said annular space that roll on said outer race inner surface, said clutch assembly also having a first set of friction clutch plates secured to said outer race outer surface and a second set of clutch plates interleaved with said first set so as to define a series of gaps arrayed axially along said outer race outer surface, and in which liquid lubricant is forced radially outwardly through said annular space and toward said outer race inner surface as said clutch assembly operates, an improved means to feed said lubricant to said interleaved clutch plates, comprising, a lubricant feed passage through said outer race, said passage including a smaller diameter opening through said outer race inner surface to receive a flow of lubricant, said entry opening being located centrally in said outer race, so as to have maximum separation from the ends of said rollers, said feed passage also flaring conically outwardly to a larger diameter exit opening through said outer race outer surface, whereby said lubricant flow is partially axially spread out, and, a generally conical spray plug fitted into said feed passage exit opening, said spray plug having a plurality of channels restricted so as to increase the velocity of said lubricant flow and further axially spread said lubricant flow for distribution to said gaps.

3. In a roller clutch assembly of the type having an inner race, a generally cylindrical outer race having an inner surface annularly spaced from said inner race and an outer surface, and a plurality of cylindrical rollers located in said annular space that roll on said outer race inner surface, said clutch assembly also having a first set of friction clutch plates secured to said outer race outer surface and a second set of clutch plates interleaved with said first set so as to define a series of gaps arrayed axially along said outer race outer surface, and in which liquid lubricant is forced radially outwardly through said annular space and toward said outer race inner surface as said clutch assembly operates, an improved means to feed said lubricant to said interleaved clutch plates, comprising, a lubricant feed passage through said outer race, said passage including a smaller diameter entry opening through said outer race inner surface to receive a flow of lubricant, said entry opening being located centrally in said outer race, so as to have maximum separation from the ends of said rollers, said feed passage also flaring conically outwardly to a larger diameter exit opening through said outer race outer surface, whereby said lubricant flow is partially axially spread out, and, a manifold member fitted to said outer race outer surface over said feed passage exit diameter opening, said manifold member having a plurality of axially distributed ports therein to further axially spread said lubricant flow for distribution to said gaps.

* * * * *